Aug. 16, 1927.

C. J. DUNZWEILER 1,639,492

STORAGE BATTERY CONTAINER

Filed Nov. 11, 1926

Inventor
Carl J. Dunzweiler
Kwis Hudson & Kent
Attys.

Patented Aug. 16, 1927.

1,639,492

UNITED STATES PATENT OFFICE.

CARL J. DUNZWEILER, OF CLEVELAND, OHIO, ASSIGNOR TO WILLARD STORAGE BATTERY COMPANY, OF CLEVELAND, OHIO, A CORPORATION OF WEST VIRGINIA.

STORAGE-BATTERY CONTAINER.

Application filed November 11, 1926. Serial No. 147,627.

This invention relates to a storage battery box or case of the type molded from rubber or other composition, and relates particularly to a new form of handle preferably of the wire type applied to the ends of the case, the handles being so formed and connected to the case that they will not warp or bend the end walls of the case when the battery is lifted and which are so formed between the ends which are preferably imbedded in the composition forming the end walls so as to better adapt them to receive the battery hold-downs, as well as to give added strength to the handles.

The invention may be briefly summarized as consisting in certain novel details of construction and combinations and arrangements of parts which will be described in the specification and set forth in the appended claims.

Figure 1:
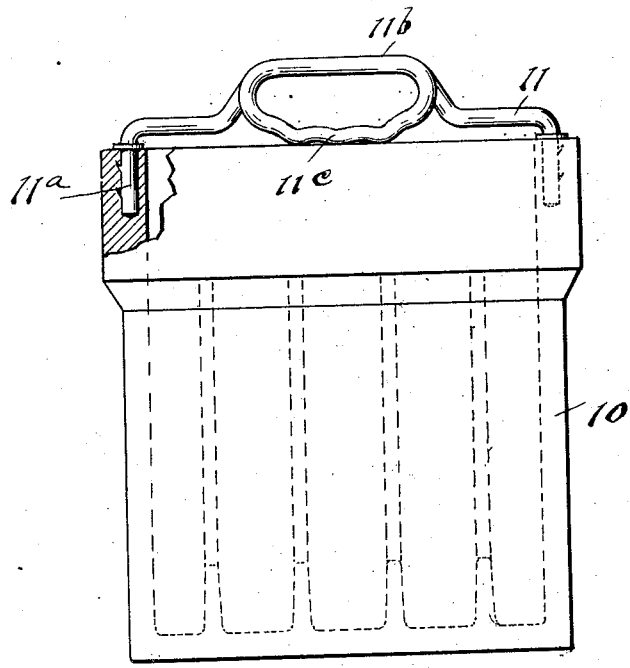
Figure 2:
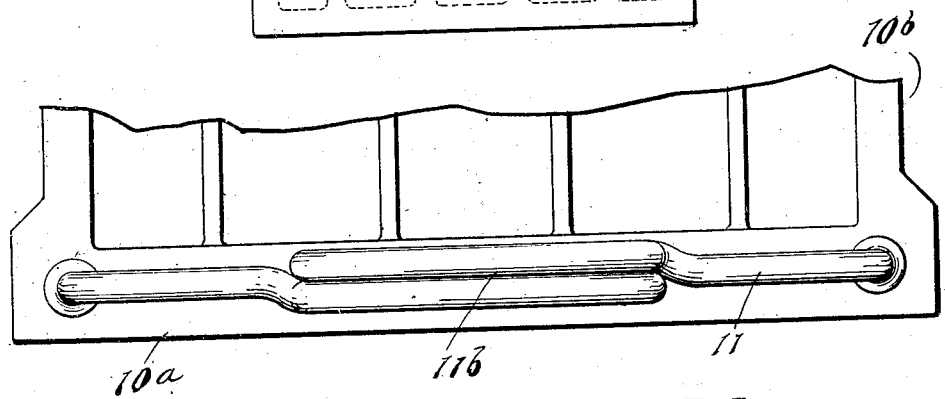
Figure 3:
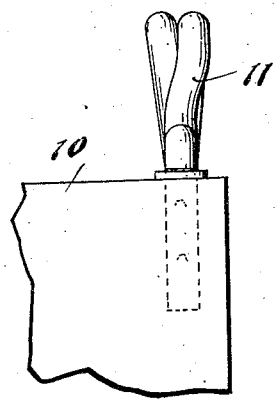

In the accompanying sheet of drawings illustrating the preferred embodiment of my invention, Fig. 1 is an end view of the case with a portion in section; Fig. 2 is a fragmentary plan view on an enlarged scale; and Fig. 3 is a fragmentary side view showing one corner of the case and the handle at one end thereof.

In the drawings, 10 represents the battery case or box molded from a suitable composition. The exterior shape or configuration may be varied as desired, and the case may have any number of compartments, one for each cell, it being understood that boxes or cases of the type to which the invention pertains are formed in one piece with integral transverse partitions forming the different compartments.

It is customary to provide these battery cases with suitable handles at the top of the end walls, the handles being sometimes imbedded in the composition forming the end walls or otherwise being attached thereto. At each end of my improved battery case, a handle 11 is provided, which is preferably of the wire type with its ends imbedded in the composition. In this instance the distance between the ends of the handle, and therefore the length of the handle crosswise of the case, is somewhat greater than usual, the ends which are designated 11ª being imbedded in the end walls of the case in line with the sides 10ᵇ thereof so that when the battery is lifted the strain caused by the weight of the battery will have no tendency whatever to bend the end walls outwardly and thus crack or break the sealing compound utilized in fastening the cell covers in place.

Between the ends 11ª of the handle, the latter is given a complete loop 11ᵇ, the top of the loop consisting of two thicknesses of wire being flat and wide enough to receive the hand, and the bottom 11ᶜ of the loop consisting of a single thickness as clearly illustrated in Fig. 1. The handle is so formed that the portions extending from the loop over the end wall to the ends 11ª are offset inwardly so as to be in line with each other and centrally of the handhold portion, as illustrated in Fig. 2.

The bottom 11ᶜ of the loop rests on top of the case and forms a seat for the battery hold-down, which may thus engage and exert considerable pressure on the handle without any liability of bending or distorting it. To better accommodate the hold-down, the middle portion of the bottom 11ᶜ of the loop is made somewhat undulating in form to provide, at the center, a slight depression, as illustrated in Fig. 1.

Having thus described my invention, what I claim is:

1. A storage battery case formed of molded composition and having wire handles at the ends thereof, said handles having their ends secured to the case and having a loop between their ends so that the upper portion thereof will form a handhold and the lower portion of the loop may receive a battery hold-down.

2. A molded storage battery case having handles with the ends secured to the case, each handle having its middle portion shaped to form a handhold and a hold-down receiving portion overlying and bearing against the top of the end wall of the case.

3. A molded storage battery case having handles at the ends thereof, each handle having its ends imbedded in the composition near the corners of the case and having between its imbedded ends a closed loop with the bottom thereof resting on the end wall.

In testimony whereof, I hereunto affix my signature.

CARL J. DUNZWEILER.